US012409381B2

(12) United States Patent
Hargett et al.

(10) Patent No.: US 12,409,381 B2
(45) Date of Patent: Sep. 9, 2025

(54) SYSTEMS AND METHODS FOR INTELLIGENT GAMING NETWORK TRAFFIC ROUTING AND OPTIMIZATION

(71) Applicant: Cox Communications, Inc., Atlanta, GA (US)

(72) Inventors: Angie Hargett, Atlanta, GA (US); John Na, Atlanta, GA (US); Yule Lobo, Atlanta, GA (US); Devin Gill, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 231 days.

(21) Appl. No.: 18/303,232

(22) Filed: Apr. 19, 2023

(65) Prior Publication Data

US 2024/0350906 A1 Oct. 24, 2024

(51) Int. Cl.
*A63F 13/35* (2014.01)
*A63F 13/77* (2014.01)

(52) U.S. Cl.
CPC .............. *A63F 13/35* (2014.09); *A63F 13/77* (2014.09)

(58) Field of Classification Search
CPC ........ A63F 13/35; A63F 13/77; A63F 13/358; A63F 13/67
USPC .......................................................... 463/42
See application file for complete search history.

(56) References Cited

U.S. PATENT DOCUMENTS

| 7,457,290 | B1* | 11/2008 | Salama | H04L 65/1104 |
| | | | | 370/392 |
| 9,270,570 | B2* | 2/2016 | Beverly | H04L 45/00 |
| 2004/0068580 | A1* | 4/2004 | Jo | H04L 41/00 |
| | | | | 709/244 |
| 2005/0188073 | A1* | 8/2005 | Nakamichi | H04L 67/1008 |
| | | | | 709/239 |
| 2008/0049621 | A1* | 2/2008 | McGuire | H04L 12/6418 |
| | | | | 370/236.2 |

FOREIGN PATENT DOCUMENTS

CN 111010341 A * 4/2020

\* cited by examiner

*Primary Examiner* — Michael A Cuff
(74) *Attorney, Agent, or Firm* — Eversheds Sutherland (US) LLP (57) ABSTRACT

Systems and methods for intelligent gaming network traffic routing and optimization are provided. The systems and methods use a combination of different types of machine learning models to predict connection performance between a user device and a game server for various connection routes between the user device and game server. For example, the models may be used to determine which set of nodes (either through a direct connection to the game server or through a gaming private network (GPN)) may provide the most optimal connection at any given time during a game session. The route between the user device and the game server may be selected by the one or more models and may be dynamically updated in real-time throughout the game session as alternative routes are predicted to provide improved network performance.

20 Claims, 8 Drawing Sheets

SYSTEMS AND METHODS FOR INTELLIGENT GAMING NETWORK TRAFFIC ROUTING AND OPTIMIZATION

BACKGROUND

During a gaming session in which a user is playing a particular video game, a device on which the user is playing the game may connect to a remote game server to exchange information over a network to facilitate the game session. For example, the game may have a multiplayer feature in which the user may be able to play the game with other users at remote locations. The connection to the game server by all of the users participating in the multiplayer game may allow for the game experience of the users at the different locations to be synchronized. This synchronization may be important so that the users at the different locations experience the same gameplay conditions as other users. For example, if the users are playing a first-person shooter game, it may be important for the timing and location of a bullet fired by one user playing on a first user device to be presented at the same timing and location from the perspective of a second user on a second user device.

This synchronization of gameplay for different users connected to the game server from different devices at different locations may be difficult as different users may experience varying connection qualities with the game server. The varying connections may depend on factors such as different connection routes that are used by the different devices to connect to the game server. For example, a user device at a first location that is connected to the game server through a first route including a first set of nodes may experience a different ping and packet loss than another user device at a second location that is connected to the game server through a second route including a second set of nodes. The performance of the connection with the game server through a particular route including a set of nodes may also change over time, which may lead to inconsistencies in gameplay performance throughout a game session, even if the same connection route is used by a device over the game session.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

This disclosure relates to, among other things, systems and methods for intelligent gaming network traffic routing and optimization. The systems and methods provide predictive insights to gamers and offer intelligent solutions to optimize their gaming experience. The solution may leverage internet and gaming network traffic data (examples of such data are provided herein) associated with historical game sessions to train various machine learning models to predict network connection routes that provide the optimal network connection performance during a game session. That is, machine learning models may automatically predict the routes (the terms "route," "path," "connection," and the like may be used interchangeably herein) that may provide the best connection between a user device hosting a game and a corresponding game server. For example, the models may determine if a user device should connect to a game server through a direct internet connection or through a gaming private network (GPN). The models may also determine specific routes through the direct internet connection or the GPN. That is, within these two connection options, a connection may be formed using various combinations of different nodes that exist in the network between the user device and the game server. The models may determine which of these nodes the connection should route through to provide the optimal connection to the game server. In addition to providing insights to gamers, the systems and methods may also automatically connect a user device to a game server through an optimal network route that is identified by the models.

Figure 2:
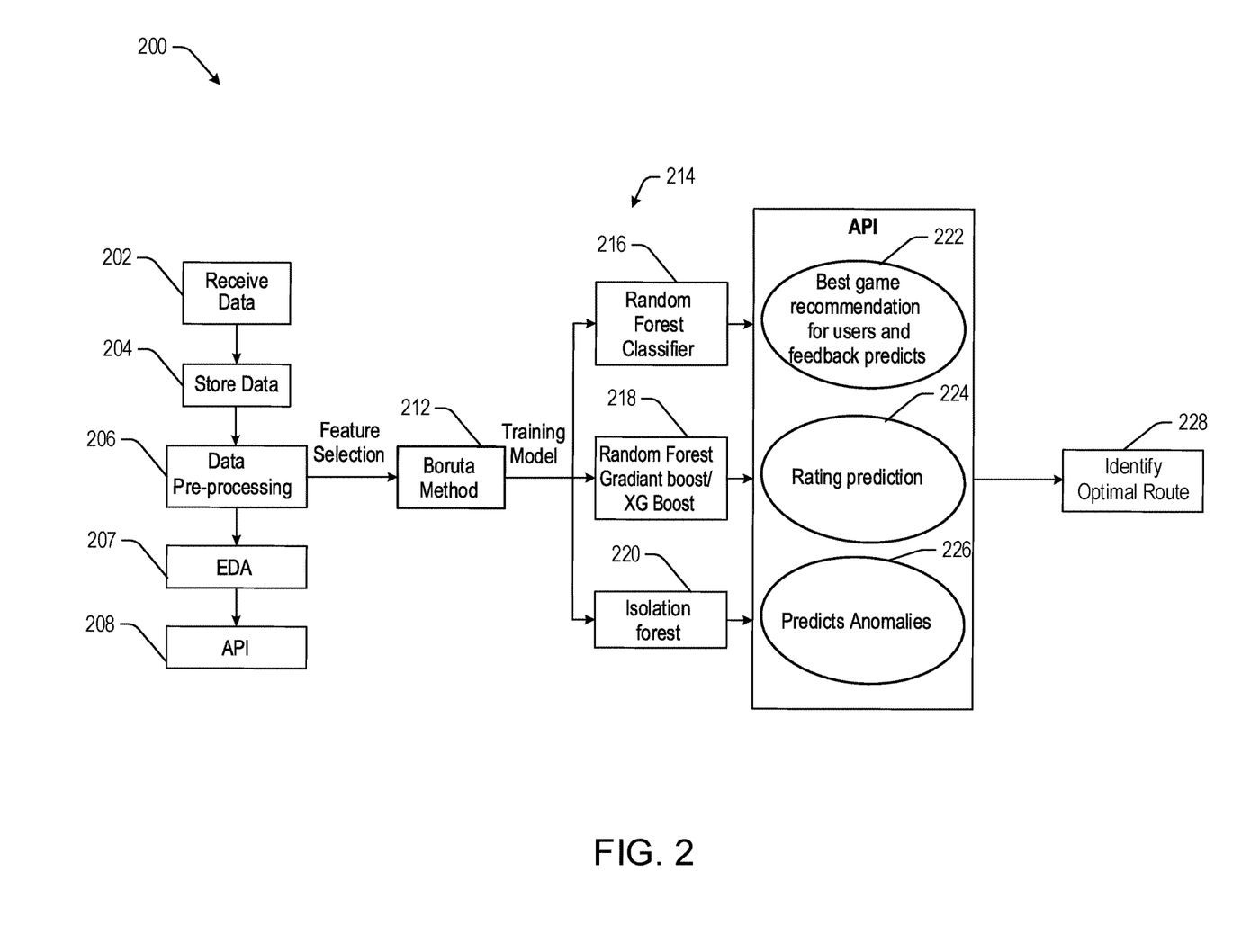
FIG. 2 depicts a flow diagram for data analysis and prediction, in accordance with one or more example embodiments of the disclosure.

The use of the machine learning models ensures that each game session has the most optimal network connection by minimizing round trip time, packet loss, pings spikes, and lag, among various other factors, during the game session. This systems and methods may also provide insights into predicted gaming experiences based on specific games, connections, geographical regions, network congestion, anomalies, and other factors. At least FIG. 2 provides further details about the manner in which the models may be used to automatically identify and adjust network routing between a user device and a game server.

The systems and methods described herein provide a number of benefits. As a first example benefit, the connection to the game server may be optimized based on the genre of the game or the specific game being played. Different genres of games are associated with different attributes that enhance the gameplay experience. For example, the experience of a user playing a game associated with the first-person shooter genre may be impacted by ping or packet round-trip time more heavily than packet loss. In contrast, the reverse may be true for a massive multiplayer online game. The models may thus be used to determine the optimal network path to the game server based on the attributes that enhance gameplay for a specific genre of game. Continuing the above examples, the models may identify the path that minimizes ping or packet round-trip time during a game session for a first-person shooter game. The models may identify a path that instead minimizes packet loss during a game session for a massive multiplayer online game. As the models are continuously trained over time, optimizations may not only be provided that are unique at the individual game level, but also for the individual gamer(s) playing the games as well.

As a second example, the systems and methods may employ a "meta" model for route selection. The models may include a combination of different types of machine learning models that may be used in parallel to complement each other and provide optimizations across a variety of factors. Leveraging multiple algorithms helps to accelerate the machine learning engine and provide real-time adjustments as needed.

As a third example, the systems and methods may provide for dynamic route selections using intelligent algorithms. During a single game session, changes can occur on the network route that degrades a game session connection to the game server. The models provide for real-time monitoring and dynamic rerouting to continuously optimize and ensure the best connection for the current game session. The models determine the optimal path based on the individual gamer's session attributes including but not limited to user location, game server location, genre, and/or game, time of day, and/or interruptions to existing path, among other factors. In this manner, the models may be used to automatically adjust the route that is used to connect the user device to the game server to ensure that the optimal route is always used. This is in contrast to a game session involving a single, consistent route throughout the entire game session, which may be subject to changes in network performance throughout the game session. However, in some instances, a single route may provide the optimal network connection and thus that single route may be maintained throughout the entirety of the game session.

As a fourth example, anomaly detection and auto-correction may also be performed. Similar to the functionally of dynamic route selections, the models may be configured to detect anomalies associated with a current network path and dynamically reroute to ensure optimal game play and session connectivity.

Figure 1A:
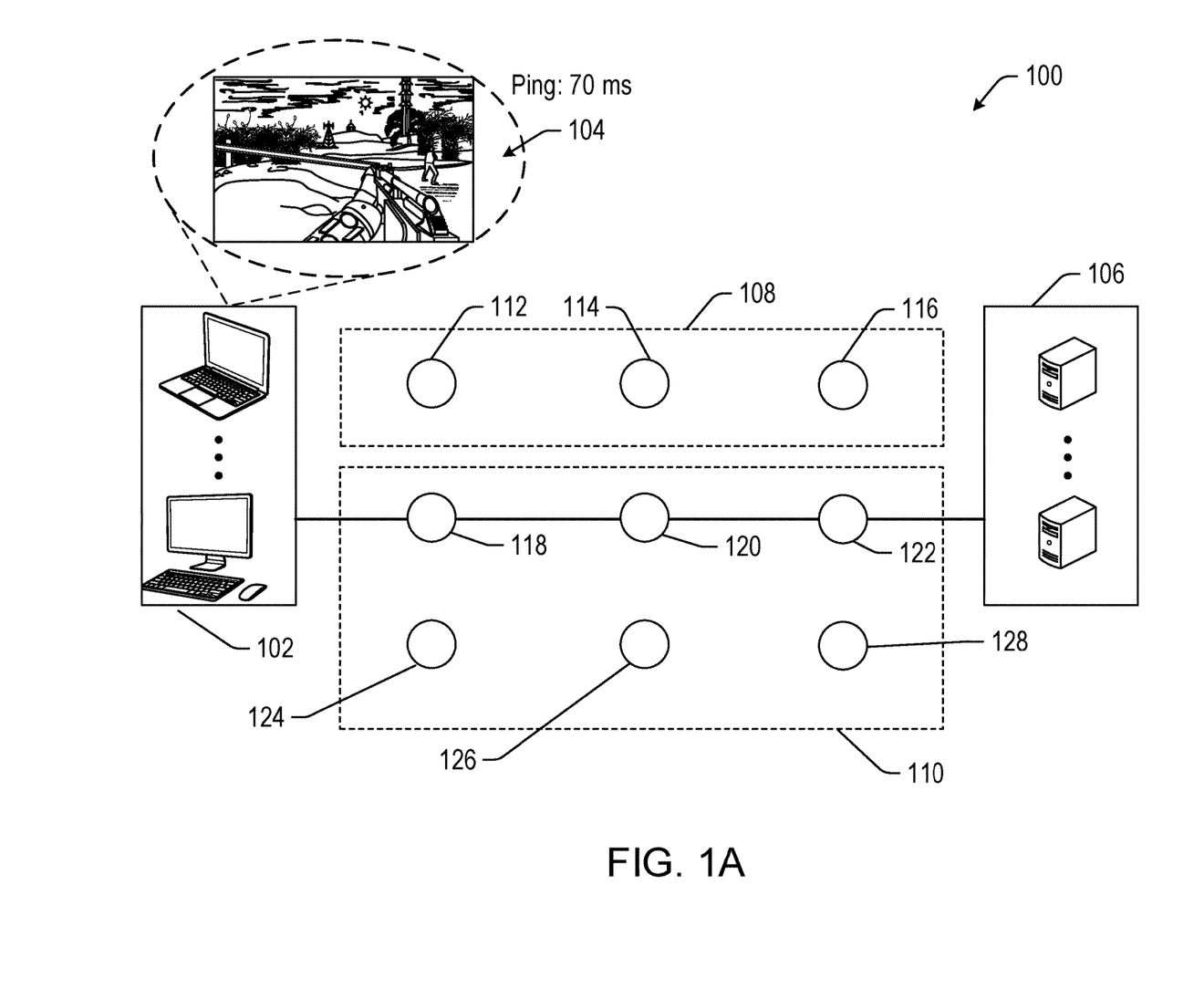
FIGS. 1A-1B depict a use case for game session route selection, in accordance with one or more example embodiments of the disclosure.
Figure 1B:
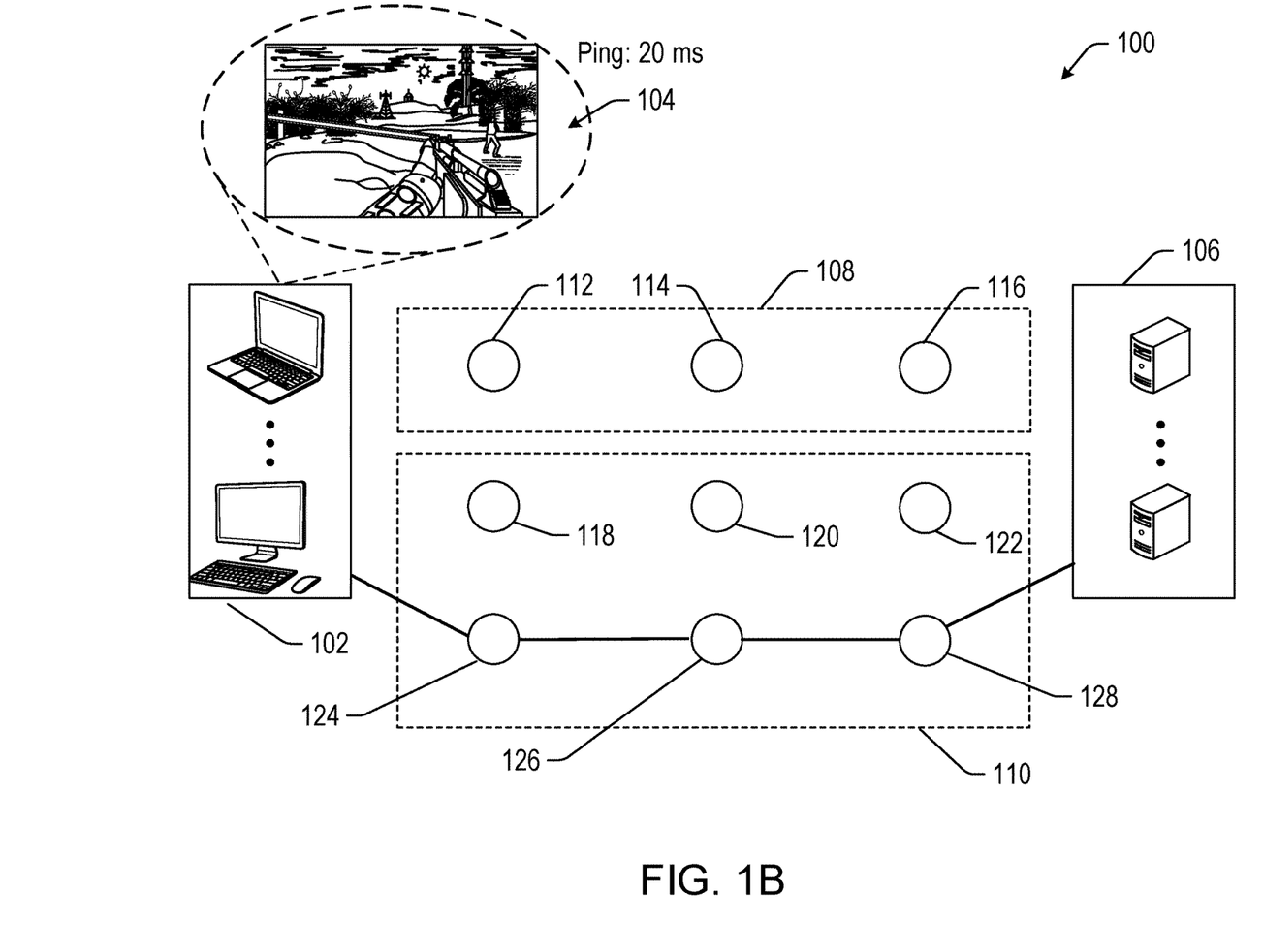

Turning to the figures, FIGS. 1A-1B depict a use case 100 for game session route selection, in accordance with one or more example embodiments of the disclosure.

The use case 100 depicts a game session in which a first-person shooter game 104 is being played using a user device 102. For example, the user device 102 may include a desktop computer, laptop computer, gaming console, and/ or any other type of device suitable for playing a video game. The first-person shooter game 104 may be a game with online features. That is, a user may be able to play the first-person shooter game 104 with other users playing the same first-person shooter game 104 on other devices that may be located remotely from the user device 102. To facilitate the gameplay between the user device 102 and any other devices running the first-person shooter game 104, the user device 102 may be connected to one or more game servers 106 (which may be referred to as a singular "game server" hereinafter for simplicity). The user device 102 and a game server 106 may exchange information over a network connection. For example, the user device 102 may provide an indication of a location of a character being controlled by the user within the first-person shooter game 104, a time at which a user provides an input to the game to shoot a gun, a direction in which the gun is pointing when the input is provided, etc. This information may be received by the server 106 and provided to any other devices running the game, such that gameplay is synchronized among the various devices running the game.

The network performance associated with the gameplay may be based on the particular route used to exchange data between the user device 102 and the game server 106. The use case 100 shows two different types of connections that may be formed between the user device 102 and the server 106. A first type of connection may include a direct connection 108 over the internet between the user device 102 and the game server 106. The second type of connection may include a non-direct connection 110, such as a connection made through a GPN or any other type of non-direct connection (such as a virtual private network (VPN), etc.). A GPN is a client/server technology that guarantees a connection for online video games that is more reliable and lower latency than a standard internet connection. In contrast, the direct connection 108 may include a standard internet connection between the user device 102 and the server 106.

The direct connection 108 and the non-direct connection 110 may also each include any number of different nodes. A node may include any number of different types of hardware and/or software elements that may facilitate communications through a network (for example, routers, switches, modems, etc.). Thus, a number of different routes between the user device 102 and the game server 106 may exist even within the direct connection 108 and the non-direct connection 110. For example, FIG. 1A shows that a connection route is formed between the user device 102 and the game server 106 through nodes 112-116. However, another non-direct connection may also be formed between the user device 102 and the game server 106 through any other combinations of nodes 112-122.

FIG. 1A also shows that the ping associated with the game session when the first route 124 including nodes 112-116 is used is 70 ms. This ping may be undesirable for gameplay associated with the first-person shooter game 104 as it may lead to synchronization issues between the games running on different user devices. Thus, the location of a first character associated with a first user playing the game through a first device may appear to be in one location on the game running on the first user device, but may appear in another location on the game running on a second user device.

To improve the network performance of the first-person shooter game 104 on the user device 102, one or more models may be used to determine an optimized network route between the user device 102 and the game server 106 in realtime. As shown in FIG. 1B, the one or more models determine a second route 126 between the user device 102 and the game server 106. The second route 126 includes the nodes 118-122 instead of the nodes 112-116. As shown in FIG. 1B, the ping associated with the second route 126 is 20 ms instead of the 70 ms associated with the first route 124. Thus, the second route 126 provides a better gameplay experience (in terms of network performance during the game session) for the first-person shooter game 104. While reference is made to ping in the use case 100, the models may also consider any other number of data, such as packet loss, jitter, and/or any other types of data described herein or otherwise. The one or more models may continue to analyze data associated with the game session and dynamically and automatically update the network routes between the user device 102 and the game server 106 in realtime to provide the most optimal connection for the gameplay. Specific details about how the models are trained and operate in real-time to determine the most optimal network route are provided in at least FIGS. 2-3.

FIG. 2 depicts a flow diagram 200 for data analysis and prediction, in accordance with one or more example embodiments of the disclosure. The flow diagram 200 illustrates example operations that may be performed in association with the training and subsequent real-time usage of the various models to determine optimal network routes between any devices on which games are being played during game sessions and the corresponding game servers.

Figure 4:
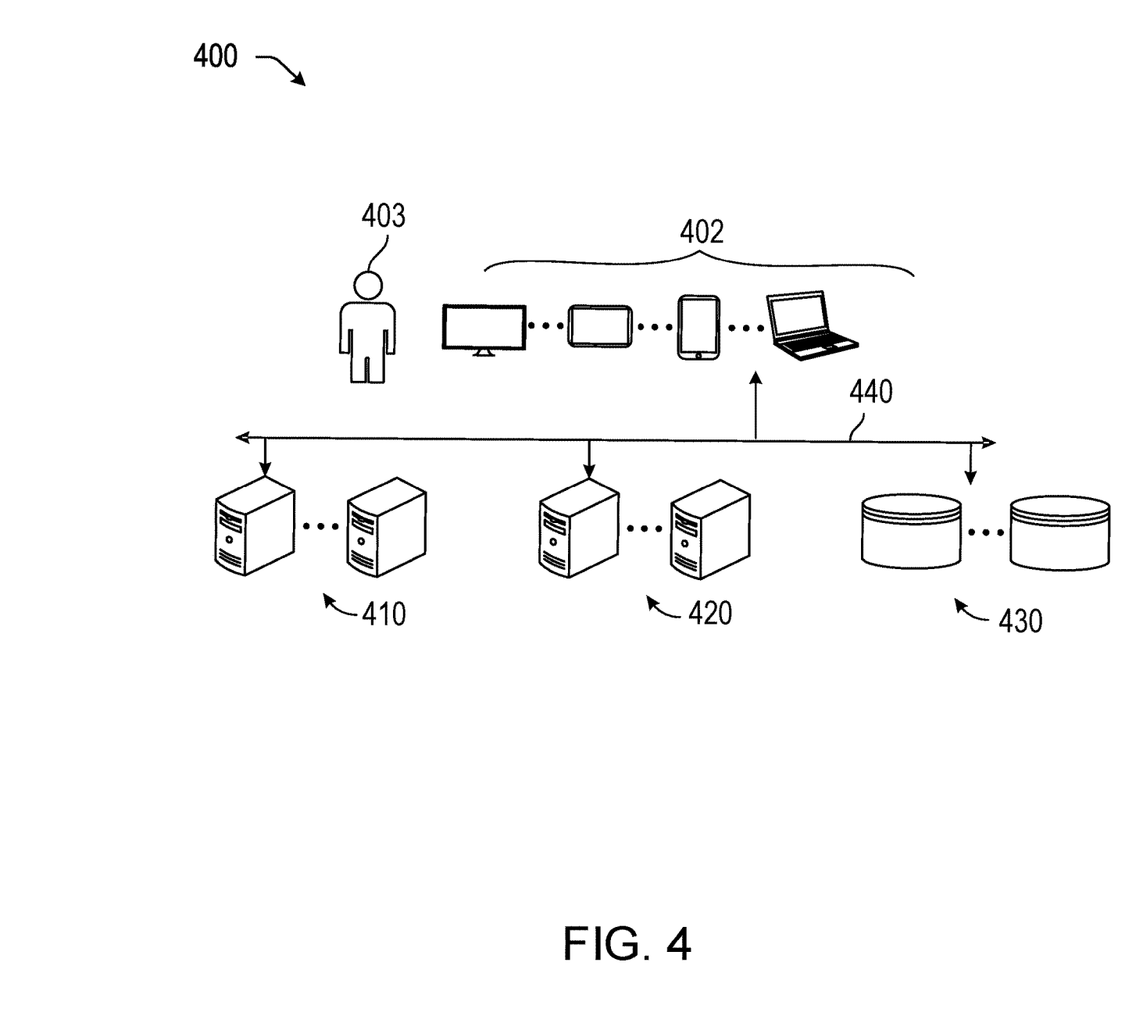
FIG. 4 depicts an example system, in accordance with one or more example embodiments of the disclosure.

At operation 202, data is obtained from a user device that is being used to initiate a game session (for example, a desktop computer, laptop computer, gaming console, or any other device that may be used to play a video game during a game session). The data may also be obtained from any other source, such as an application running on the user device, a server located remotely from the user device, a game server, etc. (for example, computing device 410, game server, user device 402, database 430, and/or any other device or system). The data may include historical data associated with game sessions previously played by one or more users. The data may also include data obtained in realtime as game sessions occur.

The data may include, for example, an identifier for a game played during a game session (such as a name of the game, a genre of the game, and/or any other identifying information), an indication of a connection object that holds multiple connections made during a single game session, a unique identifier for the device the game was played on (such as a MAC address, IP address, etc.), a total number of events received from a single session, an identifier indicating a region of the game session (for example, Asia, Europe, North America, etc.), an identifier of the game session, a direct internet jitter average value, a total number of packets lost over the direct internet connection, a total number of spikes over the direction internet connection, an average packet loss over the direct internet connection (the terms "direct connection" and "direct internet connection" may be used interchangeably herein) of the game session, an average round trip time over the direct internet for a game session, an average number of spikes over the direct internet, a maximum direct internet jitter value, a maximum round trip time over the direct internet, and/or a minimum round trip time over the direct internet.

Jitter may refer to a variation in latency of a packet flow between the user device and the game server when some packets take longer to travel between the user device and game server. Packet loss may refer to an instance where a network packet fails to reach its expected destination (e.g., the user device and/or the game server). Round trip time refers to the amount of time it takes to receive a response when a packet is transmitted (for example, the amount of time it takes for the user device to receive a response from a game server when a packet is transmitted to the game server). Ping also provides a round trip time estimate, however, ping differs in that a ping tests may be executed within the transport protocol using internet control message protocol (ICMP) packets. In contrast, round trip time may be measured at the application layer and may include the additional processing delay produced by higher level protocols and applications. A spike may refer to an extreme change in network demands (for example, greater than a threshold amount).

Similar data may also be obtained for non-direct connections to the game server. A non-direct connection may refer to, for example, a connection to the game server over a GPN and/or any other type of connection that does not involve a direct connection to the game server over the Internet. For example, a minimum jitter value associated with a non-direct connection, a minimum round trip time associated with a non-direct connection, an average jitter value of a non-direct connection, a total number of spikes over a non-direct connection, a packet loss over the non-direct connection, an average packet loss over the non-direct connection, an average round trip time over a non-direct connection, an average round trip time of the non-direct connection, and/or an average spike over the non-direct connection.

The data may also include a spike improvement value, a packet loss percent improvement value, a ping loss percentage improvement value, a ping time saved value, a session start time, a session end time, an internet protocol (IP) address associated with the device from which the game was played, a user identifier for the user playing the game, a name of the game that was played, an identifier for a user account through which the game was played, and/or a rating providing by the user for the game session. At operation 204, the data that is obtained from the user device may be stored. For example, the data may be stored in a database for processing during subsequent operations of the flow diagram 200.

The data may also be obtained periodically instead of being obtained at one specific time. For example, data may be obtained for every game session initiated by a user, daily, weekly, monthly, and/or at any other interval. In this manner, data may be collected over time such that data trends may be identified based on factors such as the types of games being played during the game sessions, the times at which the game sessions occur, the length of the game sessions, and/or any other factors that may be relevant to the performance of the game sessions.

At operation 206, data pre-processing is performed on the data that is obtained in operation 202. For example, the data pre-processing may involve reformatting and/or otherwise cleaning the raw data that is received to be suitable for processing by the one or more machine learning models. For example, the pre-processing may involve normalization of any non-normalized data, accounting for missing data entries, and/or any other types of data reformatting or cleaning.

At operation 207, an analysis of the data obtained in operation 202 may be performed to obtain insights relating to the data. For example, the analysis may involve identifying regional differences in data (for example, data in one geographical region may be associated with a first data trend compared to a different data trend associated with a different geographical region), identifying specific data types that are associated with data outliers, skews in data, etc., identifying specific types of data that had the greatest impact on game session performance, and/or any other types of insights. In conjunction with operation 207, at operation 208, a first set of application programming interfaces (APIs) may be used to provide data insights.

In one or more embodiments, the first set of APIs may include several different APIs that are configured to provide different types of information about the gaming sessions associated with the data inputs of operation 202 and/or any other data. The first API may be a user game performance API. The user game performance API may provide information about a most recent game session (e.g., the last game session played by a user) compared to one or more prior game sessions. For example, when playing a particular first person shooter game, a user experienced a 30% lower ping value compared to a prior game session of the same game. The inputs to the user game performance API may include a unique user identifier associated with the user, a name of the game that was played (reference to a "name" of a game may also refer to any other identifying information, such as a genre, etc.), and a frequency value, which may indicate the comparison to be performed. For example, a "week" frequency may compare the most recent game session to the prior game sessions performed over the last week. A "previous" frequency may compare the most recent game session to only the last game session rather than comparing the most recent game session to multiple game sessions played over a period of time. Any other frequency value may also be used. The output of the user game performance API may include a session difference, a ping improvement, and a packet loss improvement. The session difference may indicate a difference between the recent session duration and the average of the prior session durations (for example, an amount of time played during the various game sessions compared to the most recent game session). The ping improvement may indicate an improvement in the ping experienced by the user during the most recent game session compared to the average ping of the prior game sessions (for example, in a prior game session the user experienced an average ping of 45 ms and in the most recent game session the user experienced an average ping of 32 ms). The packet loss improvement may provide an indication of a change in packet loss during the most recent game session relative to the average packet loss experienced during the prior game sessions.

The second API may be a best performance time API. The best performance time API may provide information about particular times where the user experienced the best game performance. A determination of the best game performance may be based on any number of factors, such as ping, packet loss, jitter, spikes, and/or any other factors described herein ("factors" may refer to different data types described herein). For example, when playing the first person shooter game, the user experienced 15% lower ping during between 2 pm and 4 pm compared to prior game sessions. The factors that determine the best game performance may also vary depending on the genre of the game and/or the specific game being played.

The inputs to the best performance time API may include the unique user identifier for the user and the name of the game (and/or any other identifying information). The outputs of the best performance time API may include a best ping timings value and a best packet loss timings value. The best ping timings value may provide an indication of the top time ranges where the user experienced the best ping. The ping values associated with these periods may also be provided. Any threshold number of top ping timings may be provided. For example, the output may include three time ranges, five time ranges, etc. As an example of an output including three time ranges, the best performance time API may indicate that the user experienced a ping of 10 ms during the times of 11 am-12 pm, a ping of 15 ms during the times of 1 pm-3 pm, and a ping of 21 ms during the times of 8 am-9 am. However, any other number of time ranges may also be provided. The best packet loss timings may similarly provide an indication of the top time ranges where the user experienced the lowest packet loss. The packet loss values associated with these periods may also be provided.

The third API may be a user ratings API. The user ratings API may provide information about the rating values that a user provided for various game sessions. The user ratings may be indications provided by the user about the experience of the user during a given game session. For example, a user may have rated a network connection quality for one first-person shooter game as "high" and a network connection quality for a second first-person shooter game as "low." The user ratings may also provide indications of other information relating to the game session experience beyond network connection quality as well. The indications may also be provided in any other form other than strings, such as numerical values (e.g., ratings between values of one to five or any other numerical range), etc.

The input to the user ratings API may include the unique user identifier for the user. The outputs for the user ratings API may include a best rated game and a worst rated game. The best rated game may include an indication of the game with the highest rating value provided by the user, including the average rating value and number of game sessions performed by the user for the game. The worst rated game may include an indication of the game with the lowest rating value provided by the user, including the average rating value and number of game sessions performed by the user for the game.

The fourth API may include an across region insights API. The across region insights API may provide a comparison between values associated with one user in on region and values associated with other users in other regions. The inputs for the across region insight API may include a unique user identifier for the user, a region in which the user is playing the game, a name of the game, a session duration of the game session, a ping improvement value, and a packet loss improvement value. The outputs of the across region insights API may include a session difference, a ping improvement, and a packet loss improvement. The session difference may indicate a difference between a current session duration and an average of the session durations of players from other regions. The ping improvement may indicate an improvement in ping of the current user relative to the average ping of players from other regions. The packet loss improvement may indicate an improvement in packet loss of the current user relative to the average packet loss of players from other regions.

The fifth API may include a compare API. In contrast with the across region insights API, the compare API may provide a comparison between a user and other players from the same region, rather than different regions (as is the case with the fourth API). The inputs for the compare API may include a unique user identifier for the user, a region in which the user is playing the game, a name of the game, a session duration of the game session, a ping improvement value, and a packet loss improvement value. The outputs of the compare API may include a session difference, a ping improvement, and a packet loss improvement. The session difference may indicate a difference between a current session duration and an average of the session durations of players from the same region. The ping improvement may indicate an improvement in ping of the current user relative to the average ping of players from the same region. The packet loss improvement may indicate an improvement in packet loss of the current user relative to the average packet loss of players from the same region.

The sixth API may be a shapley additive explanations (SHAP) API. SHAP values may be used with a complex model (for example, a gradient boosting, a neural network, or any other model that takes some features as inputs and produces some predictions as outputs) and it is desired to understand the features that most impact the outputs of the model. The SHAP values may be provided in the form of numerical values that may be used to compare the relatively importance of various types of data that are considered by any of the models described herein.

The outputs of the first set of APIs (for example, the first API, second API, third API, fourth API, fifth API, and sixth API) may also be leveraged by the one or more machine learning models (for example, the first model 216, one or more second models 218, and third model 220) and/or any of the APIs associated with operations 222-226).

At operation 212, feature selection is performed. Feature selection may involve identifying types of data that surpass a determined importance threshold. Performing feature selection identifies a subset of data types that are most relevant to determining an optimal routing between the user device and a game server associate with a gaming session to be considered by the models, rather than considering all of the data that may potentially be captured relating to the connection. Performing the feature selection may reduce the amount of data that is used to train the various models (and reduce the amount of data that is processed by the models in real time subsequent to training) to improve processing efficiency, among other benefits. However, this is not intended to be limiting, and in some cases all of the data may be considered as well.

In some instances, this feature selection may be performed using a Boruta method (however, any other approach may also be used). The Boruta method functions by taking features of an original dataset and creating a copy of the features. Values in each column of the copy are shuffled to produce randomness. These shuffled features are known as shadow features. The shadow features are then merged with the original features to obtain a new feature space whose dimension is twice the original dataset. Next, a random forest classifier may be generated for the new features space which determines importance using a statistical test. The algorithm determines if an original feature has a higher importance than the maximum importance of shadow features. If so, the feature is considered significant and retained as a feature. Otherwise, the feature is removed from the dataset.

At operation 214, one or more different types of models may be trained based on the features selected in operation 212. A model may refer to any type of artificial intelligence, machine learning, or the like. In one or more embodiments, multiple models may be employed. For example, the flow diagram 200 depicts three different groups of models, including a first model 216, one or more second models 218, and a third model 220. The first model 216 may be a random forest classifier, the one or more second models 218 may be a random forest classifier, a gradient boost, and/or XG boost, and the third model 220 may be an isolation forest. Random forest is a classification algorithm that includes many decision trees and uses a bagging technique. The random forest creates multiple training subsets from sample training data with replacement and the final output is based on majority voting. Gradient boosting is one of the variants of ensemble methods where multiple weak models are created and combined them to obtain better performance. XG boost follows the boosting technique which combines weak learners into strong learners by creating sequential models such that the final model has the highest accuracy. These are merely examples of different models that may be used and any other types of models and/or combinations of models may also be used.

The one or more second models 218 shows that three different types of models may be used. In one or more embodiments, all three different types of models may be used and the outputs of the three models may be compared. The model that produces the highest accuracy output may be ultimately used as the model used to perform the rating prediction. However, the outputs of the three models may also be used in any other manner, including considering combinations of the outputs. Further, any other number of models may also be used as well.

Once the models are trained, operations 222-226 may involve the models calling one or more APIs to perform real-time data processing. At operation 222, a user feedback prediction may be performed. That is, the first model 216 may call the user feedback prediction API to predict user feedback that may be provided for a particular game session. User feedback may include a string of additional information beyond the numerical user rating value, where the additional information provides additional insight into the experience of the user during the game session. The inputs to the user feedback prediction API may include the features that were identified in operation 212. The data may be pre-processed and classified into a number of classes, including, for example, "good," "average," or "bad." These classes may provide an indication of a general experience of a user during a game session. Hence, the first model 216 may use the user feedback prediction API to predict how the user experiences in the gaming sessions.

At operation 224, a user rating prediction may be performed. In one or more embodiments, the user rating prediction may be performed using the one or more second models 218. The one or more second models 218 may call any combination of an eighth API, a ninth API, and a tenth API (or any singular API of the three APIs) to perform the rating predictions.

The eighth API may be a weighted average rating API. The weighted average rating API may provide the weighted average rating of ratings provided by a user over a given period of time. The inputs to the weighted average rating API may include the name of the game, the region in which the game is being played, and an indication of the time period over which the average rating is desired to be performed (for example, a given week, month, year, etc.). The outputs may include an indication of the time period (for example, a number of days, weeks, etc.), a number of game sessions that occurred during the time period, and a weighted average rating value. For example, a time period may be a single week. Two game sessions may have occurred during the week and the user may have provided a rating value of five for a first game session and a rating value of four for a second game session. The weighted average rating value may be four and a half in this case.

The ninth API may be a lower rating API. The lower rating API. The lower rating API may provide an indication of the specific game that is associated with an average rating between low and high bounds (for example, a range of possible rating values that may be provided by a user for a game session) and the number of session counts for a region in which the game is being played. The inputs to the lower rating API may include a region in which the game is being played, an indication of a time period over which it is desired to determine the average rating, a low bound of the ratings, and a high bound for the ratings. The outputs of the lower rating API may include, for each game, an average rating value for a given time period and a number of sessions that occurred during the time period.

The tenth API may be a predict rating API. The predict rating API may predict a user rating for a set of given data in addition to a prediction probability value. That is, the predict rating API may predict a rating a user may provide for a game session based on data associated with the game session, the game, the user, the use device, and/or any other factors before the user provides an actual rating. In one or more embodiments, the inputs to the predict rating API may be the features that were selected during the feature selection of operation 212. For example, the features may include a minimum non-direct connection round trip time, a minimum round trip time over a direct connection, a time at which the game session started, a difference between a start time and an end time of the game session, a percentage jitter improvement, a packet loss over a non-direct connection, a round trip time improvement percentage, a total number of packets lost over a direct connection, a ping time saved, a percentage spike improvement, a ping percent improvement, and/or a packet loss improvement percentage. However, any other types of data may also be provided as inputs. These and other features may also be used in association with any of the other APIs and/or models described herein.

The eighth, ninth, and tenth APIs may also be used to generate insights similar to the APIs associated with operation 208.

At operation 226, anomaly prediction may be performed. Anomaly prediction may be performed using the third model 220 by calling an eleventh API. An eleventh API may be an anomaly detection API. The anomaly detection API may be used to predict whether a particular game session is an anomaly compared to other game sessions. The outputs of the anomaly detection API may include a game identifier and a prediction value indicating the likelihood that the data associated with the particular game session is anomalous. If a user rating was provided for the game session, then the anomaly detection API may also return this rating. The anomaly detection API may also return an indication of specific routes between the device on which the game was being played and the game server that were used during the game session. Based on the anomaly prediction value, it may be determined whether the data should be used for route optimization or whether the data should be discarded or otherwise not considered given that the data is outlier data.

In some instances, the following features may be used to perform anomaly prediction. A direct connection jitter average value, a total packets lost over a direct connection, a total number of spikes over a direct connection, an average packet loss over a direct connection for a game session, an average round trip time for a game session over a direct connection, an average number of spikes over a direct connection, a maximum direct connection jitter value, a maximum round trip time value over a direct connection, a maximum jitter value over a non-direct connection, an average jitter value over a non-direct connection, a packet loss over a non-direct connection, a total number of spikes over a non-direct connection, an average packet loss over a non-direct connection, an average round trip time over a non-direct connection, and/or average spike over a non-direct connection. However, in some instances, the same features used to perform the predict rating may be used in association with the anomaly prediction. Any other types of features may also be used for anomaly prediction.

At operation 228, the outputs of the various models based on the API calls may then be used to determine an optimal network connection route between a user device and a game server for a game session. The user device may be automatically connected to the game server through the optimal route as well.

Figure 3A:
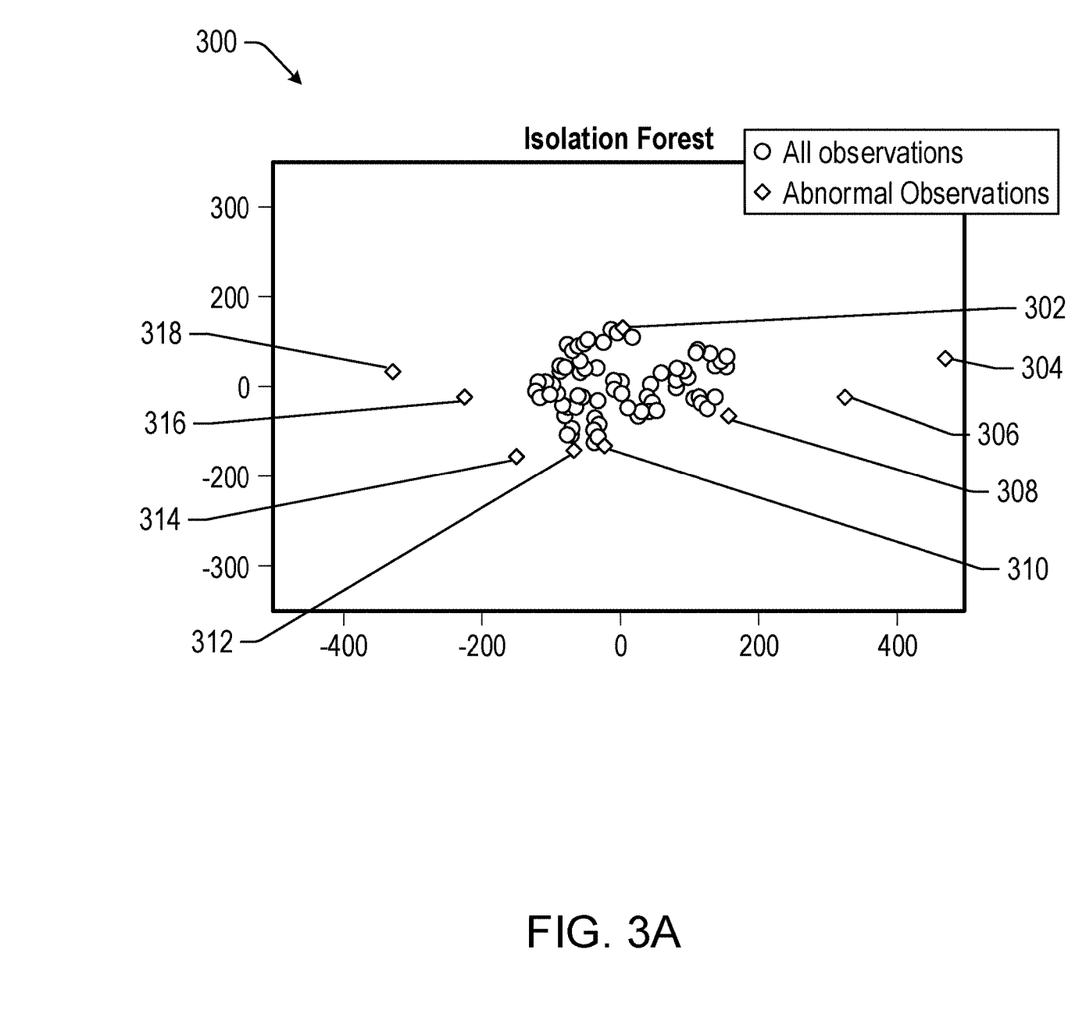
FIG. 3A depicts an example isolation forest model for anomaly prediction, in accordance with one or more example embodiments of the disclosure.

FIG. 3A depicts an example isolation forest plot 300 for anomaly prediction, in accordance with one or more example embodiments of the disclosure. An isolation forest is an unsupervised decision-tree-based algorithm that may be used for outlier detection in data, which may involve splitting sub-samples of the data according to some feature at random. The plot 300 shows various data points, including a number of abnormal data points (for example, abnormal data points 302-318).

Figure 3B:
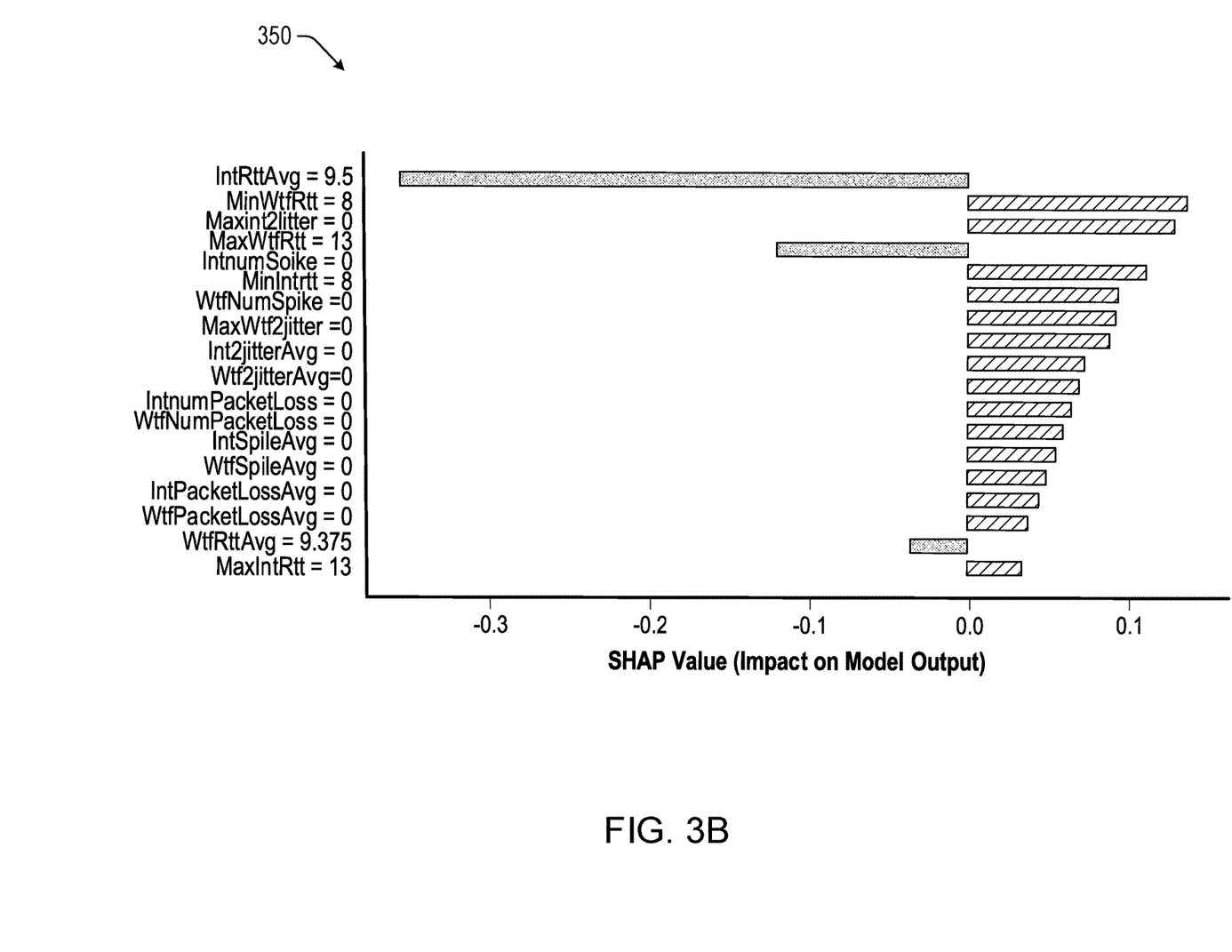
FIG. 3B depicts an example plot for anomaly prediction, in accordance with one or more example embodiments of the disclosure.

FIG. 3B depicts an example plot 350 for anomaly prediction, in accordance with one or more example embodiments of the disclosure. Particularly, the plot 350 is a SHAP interpretation bar plot, which may illustrate the contribution of each feature towards the output. From the plot 350 it may be determined that the bars associated with negative values are the factors that had an impact on predicting the data as anomaly and the bars associated with positive values may include normal data. Since the majority of the features was predicted as normal (e.g., associated with positive values), the output of anomaly prediction in this instance may indicate that the data is not anomalous. The SHAP values may also be used for feature selection associated with operation 212 as well.

FIG. 4 depicts an example system 400, in accordance with one or more example embodiments of the disclosure. In one or more embodiments, the system may include one or more user devices 402 (which may be associated with one or more users 403), one or more computing devices 410, one or more game servers 420, and/or one or more databases 430. However, these components of the system 400 are merely exemplary and are not intended to be limiting in any way. For simplicity, reference may be made hereinafter to a user device 402, computing device 410, game server 420, database 430, etc., however, this is not intended to be limiting and may still refer to any number of such elements.

The user device 402 may be any type of device, such as a smartphone, desktop computer, laptop computer, tablet, and/or any other type of device. The user device 402 may be a device on which a game is hosted during a game session. That is, the user 403 may play the game during the game session using the user device 402. During a gaming session in which a user 403 is playing a particular video game, the user device 402 on which the user 403 is playing the game may connect to a remote game server 420 to exchange information over a network 440 to facilitate the game session. For example, the game may have a multiplayer feature in which the user 403 may be able to play the game with other users at remote locations. The connection to the game server 420 by all of the user participating in the multiplayer game may allow for the game experience of the users at the different locations to be synchronized.

The computing device 410 may be any type of device or system used to perform any of the processing described herein. For example, the computing device 410 may be a remote server that may host any of the models and APIs described herein that may be used to make determinations as to connection routes that should be used to connect the user device 402 to the game server 420. However, any of this processing may also be performed by the user device 402 and/or the game server 420 as well.

The database 430 may store any of the data that is used as described herein. For example, the database 430 may store any data captured from the user device 402 and/or the game server 420, including network performance information, such as ping, packet loss, and/or any other types of data described herein or otherwise.

In one or more embodiments, any of the elements of the system 400 (for example, one or more user devices 402, one or more computing devices 410, one or more game servers 420, one or more databases 430, and/or any other element described with respect to FIG. 4 or otherwise) may be configured to communicate via a communications network 440. Finally, any of the elements (for example, one or more mobile devices 402, one or more computing devices 410, one or more game servers 420, and/or one or more databases 430) of the system 400 may include any of the elements of the computing device 600 as well (for example, any of the hardware and/or software components).

Figure 5:
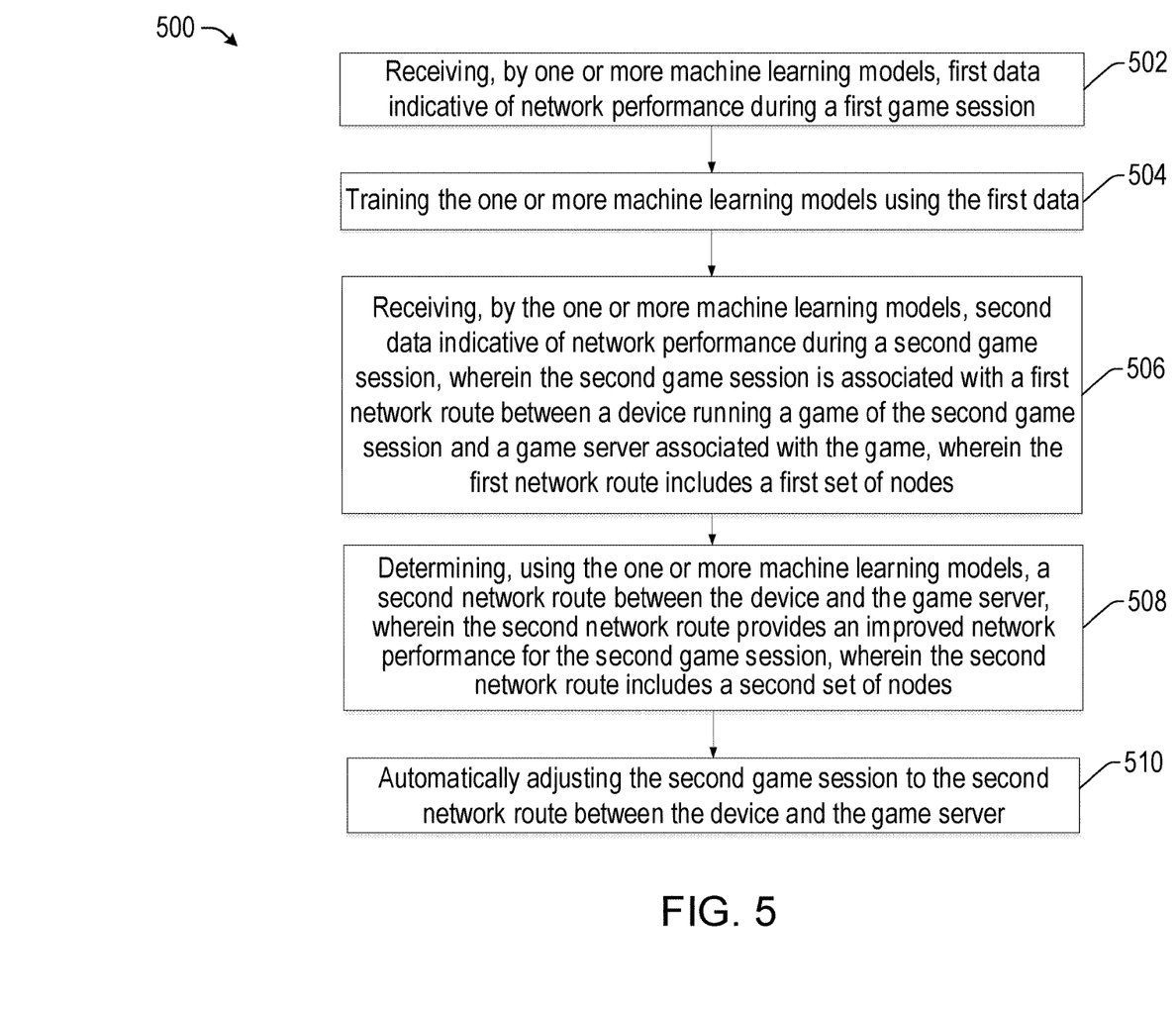
FIG. 5 depicts an example method, in accordance with one or more example embodiments of the disclosure.

FIG. 5 depicts an example method 500 in accordance with one or more example embodiments of the disclosure. The method 500 may be performed using computer-executable instructions stored on the memory of a device or system (for example, user device 102, game server 106, computing device 600, and/or any other device or system described herein or otherwise). The blocks of the method 500 may be performed in any order and are not necessarily limited to the particular order illustrated in FIG. 5.

At block 502 of the method 500, computer-executable instructions stored on the memory of a device or system may be executed to receive, by one or more machine learning models, first data indicative of network performance during a first game session. For example the first data may include data associated with one or more prior game sessions that may be used to train any of the machine learning models that may be used to predict optimal network routes between a given device hosting a game session and a game server to which the device is connected. The first data may include any of the data described herein. For example, the first data may include an identifier for a game played during a game session, an indication of a connection object that holds multiple connections made during a single game session, a unique identifier for the device the game was played on, a total number of events received from a single session, an identifier indicating a region of the game session (for example, Asia, Europe, North America, etc.), an identifier of the game session, a direct internet jitter average value, a total number of packets lost over the direct internet connection, a total number of spikes over the direction internet connection, an average packet loss over the direct internet connection of the game session, an average round trip time over the direct internet for a game session, an average number of spikes over the direct internet, a maximum direct internet jitter value, a maximum round trip time over the direct internet, and/or a minimum round trip time over the direct internet.

Similar data may also be obtained for non-direct connections to the game server. A non-direct connection may refer to, for example, a connection to the game server over a gaming private network (GPN) and/or any other type of connection that does not involve a direct connection to the game server over the Internet. For example, a minimum jitter value associated with a non-direct connection, a minimum round trip time associated with a non-direct connection, an average jitter value of a non-direct connection, a total number of spikes over a non-direct connection, a packet loss over the non-direct connection, an average packet loss over the non-direct connection, an average round trip time over a non-direct connection, an average round trip time of the non-direct connection, and/or an average spike over the non-direct connection.

The data may also include a spike improvement value, a packet loss percent improvement value, a ping loss percentage improvement value, a ping time saved value, a session start time, a session end time, an internet protocol (TP) address associated with the device from which the game was played, a user identifier for the user playing the game, a name of the game that was played, an identifier for a user account through which the game was played, and/or a rating providing by the user for the game session.

At block 504 of the method 500, computer-executable instructions stored on the memory of a device or system may be executed to train the one or more machine learning models using the first data. For example, a first model may be trained to provide user feedback predictions. In one or more embodiments, the first model may include a random forest classifier. One or more second models may be trained to determine a user rating prediction. In one or more embodiments, the one or more second models may include a random forest classifier, a gradient boost, and/or an XG boost. In some instances, all three models may be used and an output of a model that is associated with the highest degree of accuracy may be used as the ultimate output of the one or more second models. A third model may be trained to predict anomalies associated with any of the data. In one or more embodiments, the third model may include an isolation forest.

At block 506 of the method 500, computer-executable instructions stored on the memory of a device or system may be executed to receive, by the one or more machine learning models, second data indicative of network performance during a second game session, wherein the second game session is associated with a first network route between a device running a game of the second game session and a game server associated with the game, wherein the first network route includes a first set of nodes. The second game session may include a game session that occurs at a time subsequent to the first game session. The second game session may be associated with the same game as the first game session, a game of the same genre as the first game session, or a different game and/or a game of a different genre.

Additionally, the first data and/or the second data may be filtered into a subset of data that is determined to be the most relevant to determining an optimal network route between the device and the game server. In some instances, the subset of data may be determined using a Boruta method, however, this is not intended to be limiting. As an example, the subset of data may include a minimum non-direct connection round trip time, a minimum round trip time over a direct connection, a time at which the game session started, a difference between a start time and an end time of the game session, a percentage jitter improvement, a packet loss over a non-direct connection, a round trip time improvement percentage, a total number of packets lost over a direct connection, a ping time saved, a percentage spike improvement, a ping percent improvement, and/or a packet loss improvement percentage.

At block 508 of the method 500, computer-executable instructions stored on the memory of a device or system may be executed to determine, using the one or more machine learning models, a second network route between the device and the game server, wherein the second network route provides an improved network performance for the second game session, wherein the second network route includes a second set of nodes. In one or more embodiments, the first network route may be associated with a direct internet connection between the device and the game server, and wherein the second network route is associated with a gaming private network (GPN) between the device and the game server. The first network route may also include a first set of nodes included within a gaming private network (GPN) between the device and the game server, and wherein the second network route includes a second set of nodes included within the gaming private network (GPN) between the device and the game server.

At block 510 of the method 500, computer-executable instructions stored on the memory of a device or system may be executed to automatically adjust the second game session to the second network route between the device and the game server. However, in some cases, an indication of the second network route may be provided to the user and the user may manually indicate that they desire for the network route to switch to the second network route.

Figure 6:
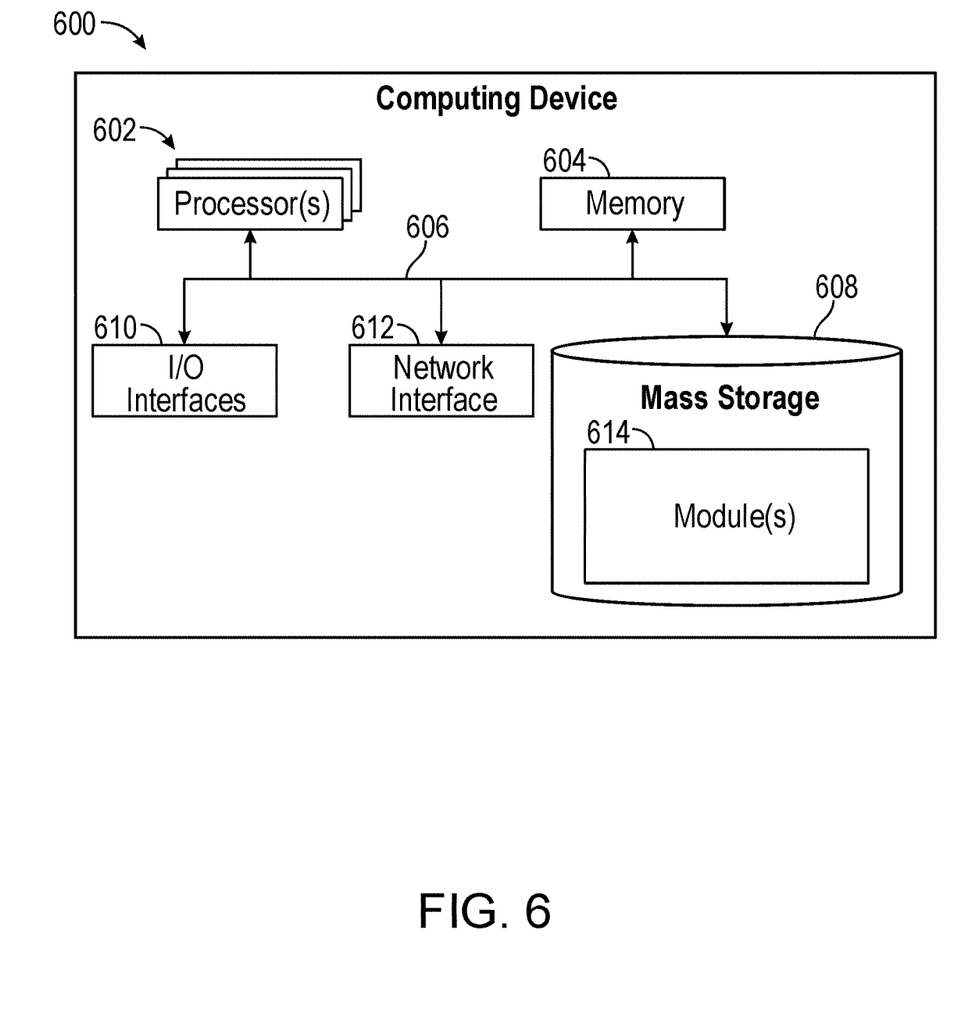
FIG. 6 depicts a schematic illustration of an example computing device architecture, in accordance with one or more example embodiments of the disclosure.

FIG. 6 illustrates an example computing device 600, in accordance with one or more embodiments of this disclosure. The computing 600 device may be representative of any number of elements described herein. The computing device 600 may include at least one processor 602 that executes instructions that are stored in one or more memory devices (referred to as memory 604). The instructions can be, for instance, instructions for implementing functionality described as being carried out by one or more modules and systems disclosed above or instructions for implementing one or more of the methods disclosed above. The processor(s) 602 can be embodied in, for example, a CPU, multiple CPUs, a GPU, multiple GPUs, a TPU, multiple TPUs, a multicore processor, a combination thereof, and the like. In some embodiments, the processor(s) 602 can be arranged in a single processing device. In other embodiments, the processor(s) 602 can be distributed across two or more processing devices (e.g., multiple CPUs; multiple GPUs; a combination thereof, or the like). A processor can be implemented as a combination of processing circuitry or computing processing units (such as CPUs, GPUs, or a combination of both). Therefore, for the sake of illustration, a processor can refer to a single-core processor; a single processor with software multithread execution capability; a multicore processor; a multicore processor with software multithread execution capability; a multicore processor with hardware multithread technology; a parallel processing (or computing) platform; and parallel computing platforms with distributed shared memory. Additionally, or as another example, a processor can refer to an integrated circuit (IC), an ASIC, a digital signal processor (DSP), an FPGA, a PLC, a complex programmable logic device (CPLD), a discrete gate or transistor logic, discrete hardware components, or any combination thereof designed or otherwise configured (e.g., manufactured) to perform the functions described herein.

The processor(s) 602 can access the memory 604 by means of a communication architecture 606 (e.g., a system bus). The communication architecture 606 may be suitable for the particular arrangement (localized or distributed) and type of the processor(s) 602. In some embodiments, the communication architecture 606 can include one or many bus architectures, such as a memory bus or a memory controller; a peripheral bus; an accelerated graphics port; a processor or local bus; a combination thereof, or the like. As an illustration, such architectures can include an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnect (PCI) bus, a PCI-Express bus, a Personal Computer Memory Card International Association (PCMCIA) bus, a Universal Serial Bus (USB), and/or the like.

Memory components or memory devices disclosed herein can be embodied in either volatile memory or nonvolatile memory or can include both volatile and nonvolatile memory. In addition, the memory components or memory devices can be removable or nonremovable, and/or internal or external to a computing device or component. Examples of various types of non-transitory storage media can include hard-disc drives, zip drives, CD-ROMs, digital versatile disks (DVDs) or other optical storage, magnetic cassettes, magnetic tape, magnetic disk storage or other magnetic storage devices, flash memory cards or other types of memory cards, cartridges, or any other non-transitory media suitable to retain the desired information and which can be accessed by a computing device.

As an illustration, nonvolatile memory can include read-only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory devices or memories of the operational or computational environments described herein are intended to include one or more of these and/or any other suitable types of memory. In addition to storing executable instructions, the memory 604 also can retain data.

Each computing device 600 also can include mass storage 608 that is accessible by the processor(s) 602 by means of the communication architecture 606. The mass storage 608 can include machine-accessible instructions (e.g., computer-readable instructions and/or computer-executable instructions). In some embodiments, the machine-accessible instructions may be encoded in the mass storage 608 and can be arranged in components that can be built (e.g., linked and compiled) and retained in computer-executable form in the mass storage 608 or in one or more other machine-accessible non-transitory storage media included in the computing device 600. Such components can embody, or can constitute, one or many of the various modules disclosed herein. Such modules are illustrated as modules 614. In some instances, the modules may also be included within the memory 604 as well.

Execution of the modules 614, individually or in combination, by at least one of the processor(s) 602, can cause the computing device 600 to perform any of the operations described herein (for example, the operations described with respect to FIG. 5, as well as any other operations).

Each computing device 600 also can include one or more input/output interface devices 610 (referred to as I/O interface 610) that can permit or otherwise facilitate external devices to communicate with the computing device 600. For instance, the I/O interface 610 may be used to receive and send data and/or instructions from and to an external computing device.

The computing device 600 also includes one or more network interface devices 612 (referred to as network interface(s) 612) that can permit or otherwise facilitate functionally coupling the computing device 600 with one or more external devices. Functionally coupling the computing device 600 to an external device can include establishing a wireline connection or a wireless connection between the computing device 600 and the external device. The network interface devices 612 can include one or many antennas and a communication processing device that can permit wireless communication between the computing device 600 and another external device. For example, between a vehicle and a smart infrastructure system, between two smart infrastructure systems, etc. Such a communication processing device can process data according to defined protocols of one or several radio technologies. The radio technologies can include, for example, 3G, Long Term Evolution (LTE), LTE-Advanced, 5G, IEEE 802.11, IEEE 802.16, Bluetooth, ZigBee, near-field communication (NFC), and the like. The communication processing device can also process data according to other protocols as well, such as vehicle-to-infrastructure (V2I) communications, vehicle-to-vehicle (V2V) communications, and the like. The network interface(s) 512 may also be used to facilitate peer-to-peer ad-hoc network connections as described herein.

As used in this application, the terms "environment," "system," "unit," "module," "architecture," "interface," "component," and the like refer to a computer-related entity or an entity related to an operational apparatus with one or more defined functionalities. The terms "environment," "system," "module," "component," "architecture," "interface," and "unit," can be utilized interchangeably and can be generically referred to functional elements. Such entities may be either hardware, a combination of hardware and software, software, or software in execution. As an example, a module can be embodied in a process running on a processor, a processor, an object, an executable portion of software, a thread of execution, a program, and/or a computing device. As another example, both a software application executing on a computing device and the computing device can embody a module. As yet another example, one or more modules may reside within a process and/or thread of execution. A module may be localized on one computing device or distributed between two or more computing devices. As is disclosed herein, a module can execute from various computer-readable non-transitory storage media having various data structures stored thereon. Modules can communicate via local and/or remote processes in accordance, for example, with a signal (either analogic or digital) having one or more data packets (e.g., data from one component interacting with another component in a local system, distributed system, and/or across a network such as a wide area network with other systems via the signal).

As yet another example, a module can be embodied in or can include an apparatus with a defined functionality provided by mechanical parts operated by electric or electronic circuitry that is controlled by a software application or firmware application executed by a processor. Such a processor can be internal or external to the apparatus and can execute at least part of the software or firmware application. Still, in another example, a module can be embodied in or can include an apparatus that provides defined functionality through electronic components without mechanical parts. The electronic components can include a processor to execute software or firmware that permits or otherwise facilitates, at least in part, the functionality of the electronic components.

In some embodiments, modules can communicate via local and/or remote processes in accordance, for example, with a signal (either analog or digital) having one or more data packets (e.g., data from one component interacting with another component in a local system, distributed system, and/or across a network such as a wide area network with other systems via the signal). In addition, or in other embodiments, modules can communicate or otherwise be coupled via thermal, mechanical, electrical, and/or electro-mechanical coupling mechanisms (such as conduits, connectors, combinations thereof, or the like). An interface can include input/output (I/O) components as well as associated processors, applications, and/or other programming components.

Further, in the present specification and annexed drawings, terms such as "store," "storage," "data store," "data storage," "memory," "repository," and substantially any other information storage component relevant to the operation and functionality of a component of the disclosure, refer to memory components, entities embodied in one or several memory devices, or components forming a memory device. It is noted that the memory components or memory devices described herein embody or include non-transitory computer storage media that can be readable or otherwise accessible by a computing device. Such media can be implemented in any methods or technology for storage of information, such as machine-accessible instructions (e.g., computer-readable instructions), information structures, program modules, or other information objects.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, techniques, and computer program products that, individually and in combination, permit the automated provision of an update for a vehicle profile package. It is, of course, not possible to describe every conceivable combination of components and/or methods for purposes of describing the various elements of the disclosure, but it can be recognized that many further combinations and permutations of the disclosed elements are possible. Accordingly, it may be apparent that various modifications can be made to the disclosure without departing from the scope or spirit thereof. In addition, or as an alternative, other embodiments of the disclosure may be apparent from consideration of the specification and annexed drawings, and practice of the disclosure as presented herein. It is intended that the examples put forth in the specification and annexed drawings be considered, in all respects, as illustrative and not limiting. Although specific terms are employed herein, they are used in a generic and descriptive sense only and not for purposes of limitation.

That which is claimed is:

1. A system comprising:
   memory that stores computer-executable instructions; and
   one or more processors configured to access the memory and execute the computer-executable instructions to:
   receive first data indicative of network performance during a first game session;
   train one or more machine learning models using the first data;

receive second data indicative of network performance during a second game session, wherein the second game session is associated with a first network route between a device running a game of the second game session and a game server associated with the game, wherein the first network route includes a first set of nodes;

determine, using the one or more machine learning models, a second network route between the device and the game server, wherein the second network route provides an improved network performance for the second game session, wherein the second network route includes a second set of nodes; and automatically adjust the second game session to the second network route between the device and the game server.

2. The system of claim 1, wherein the one or more machine learning models include a first model associated with a user feedback prediction, one or more second models associated with a user rating prediction, and a third model associated with an anomaly prediction.

3. The system of claim 2, wherein the one or more second models include a fourth model, a fifth model, and a sixth model, and wherein the one or more processors are further configured to execute the computer-executable instructions to:

determine a first output from the fourth model, a second output from the fifth model, and a third output from the sixth model; and determine that the first output is associated with a greater accuracy than the second output and the third output, wherein the user rating prediction is based on the first output.

4. The system of claim 1, wherein the second data includes a minimum packet round trip time, a start time of the second game session, a difference between the start time and an end time of the second game session, a percentage jitter improvement, a total number of packets loss, a round trip time improvement percentage, a ping time saved, a percentage spike improvement, a percentage ping improvement, and/or a percentage packet loss improvement.

5. The system of claim 1, wherein the first network route is associated with a direct internet connection between the device and the game server, and wherein the second network route is associated with a gaming private network (GPN) between the device and the game server.

6. The system of claim 1, wherein the first network route includes a first set of nodes included within a gaming private network (GPN) between the device and the game server, and wherein the second network route includes a second set of nodes included within the gaming private network (GPN) between the device and the game server.

7. The system of claim 1, wherein determining the second network route is based on a third set of data, wherein the third set of data is a subset of the second set of data, and wherein the third set of data is determined using a random forest classifier.

8. A method comprising:

receiving, by one or more machine learning models, first data indicative of network performance during a first game session;

training the one or more machine learning models using the first data;

receiving, by the one or more machine learning models, second data indicative of network performance during a second game session, wherein the second game session is associated with a first network route between a device running a game of the second game session and a game server associated with the game, wherein the first network route includes a first set of nodes;

determining, using the one or more machine learning models, a second network route between the device and the game server, wherein the second network route provides an improved network performance for the second game session, wherein the second network route includes a second set of nodes; and automatically adjusting the second game session to the second network route between the device and the game server.

9. The method of claim 8, wherein the one or more machine learning models include a first model associated with a user feedback prediction, one or more second models associated with a user rating prediction, and a third model associated with an anomaly prediction.

10. The method of claim 9, wherein the one or more second models include a fourth model, a fifth model, and a sixth model, wherein the method further comprises:

determining a first output from the fourth model, a second output from the fifth model, and a third output from the sixth model; and determining that the first output is associated with a greater accuracy than the second output and the third output, wherein the user rating prediction is based on the first output.

11. The method of claim 8, wherein the second data includes a minimum packet round trip time, a start time of the second game session, a difference between the start time and an end time of the second game session, a percentage jitter improvement, a total number of packets loss, a round trip time improvement percentage, a ping time saved, a percentage spike improvement, a percentage ping improvement, and/or a percentage packet loss improvement.

12. The method of claim 8, wherein the first network route is associated with a direct internet connection between the device and the game server, and wherein the second network route is associated with a gaming private network (GPN) between the device and the game server.

13. The method of claim 8, wherein the first network route includes a first set of nodes included within a gaming private network (GPN) between the device and the game server, and wherein the second network route includes a second set of nodes included within the gaming private network (GPN) between the device and the game server.

14. The method of claim 8, wherein determining the second network route is based on a third set of set, wherein the third set of data is a subset of the second set of data, and wherein the third set of data is determined using a random forest classifier.

15. A non-transitory computer-readable medium storing computer-executable instructions, that when executed by one or more processors, cause the one or more processors to perform operations of:

receiving, by one or more machine learning models, first data indicative of network performance during a first game session;

training the one or more machine learning models using the first data;

receiving, by the one or more machine learning models, second data indicative of network performance during a second game session, wherein the second game session is associated with a first network route between a device running a game of the second game session and a game server associated with the game, wherein the first network route includes a first set of nodes;

determining, using the one or more machine learning models, a second network route between the device and the game server, wherein the second network route provides an improved network performance for the second game session, wherein the second network route includes a second set of nodes; and automatically adjusting the second game session to the second network route between the device and the game server.

16. The non-transitory computer-readable medium of claim 15, wherein the one or more machine learning models include a first model associated with a user feedback prediction, one or more second models associated with a user rating prediction, and a third model associated with an anomaly prediction.

17. The non-transitory computer-readable medium of claim 16, wherein the one or more second models include a fourth model, a fifth model, and a sixth model, and wherein the one or more processors are further configured to execute the computer-executable instructions to:

determining a first output from the fourth model, a second output from the fifth model, and a third output from the sixth model; and determining that the first output is associated with a greater accuracy than the second output and the third output, wherein the user rating prediction is based on the first output.

18. The non-transitory computer-readable medium of claim 15, wherein the second data includes a minimum packet round trip time, a start time of the second game session, a difference between the start time and an end time of the second game session, a percentage jitter improvement, a total number of packets loss, a round trip time improvement percentage, a ping time saved, a percentage spike improvement, a percentage ping improvement, and/or a percentage packet loss improvement.

19. The non-transitory computer-readable medium of claim 15, wherein the first network route is associated with a direct internet connection between the device and the game server, and wherein the second network route is associated with a gaming private network (GPN) between the device and the game server.

20. The non-transitory computer-readable medium of claim 15, wherein the first network route includes a first set of nodes included within a gaming private network (GPN) between the device and the game server, and wherein the second network route includes a second set of nodes included within the gaming private network (GPN) between the device and the game server.

* * * * *